Sept. 10, 1946. G. F. VINSANT 2,407,620
SWITCH FOR TROLLEY RAILS
Filed June 16, 1944 2 Sheets-Sheet 1

Inventor
Granville F. Vinsant
By
R. G. Story
Attorney

Sept. 10, 1946.   G. F. VINSANT   2,407,620
SWITCH FOR TROLLEY RAILS
Filed June 16, 1944   2 Sheets-Sheet 2

Inventor
Granville F. Vinsant
By R. G. Story
Attorney

Patented Sept. 10, 1946

2,407,620

UNITED STATES PATENT OFFICE 2,407,620

SWITCH FOR TROLLEY RAILS

Granville Franklin Vinsant, Fort Worth, Tex., assignor to Industrial Patents Corporation, Chicago, Ill., a corporation of Delaware Application June 16, 1944, Serial No. 540,619

1 Claim. (Cl. 104—97)

This invention relates to a switch, and more particularly to a switch for overhead trolleys.

Heretofore it has been the usual practice in the cutting up of carcass beef suspended from a trolley, to first sever the forequarter from a carcass beef and then permit the hindquarter to continue moving along on the trolley, travelling along an overhead track. As the trolley conveys the hindquarter down along the track, it is sometimes desirable to turn the cup 180° around to do work on both sides, and in the past, this has been accomplished by a track and conventional switch arrangement, before pushing the hindquarter onto a track at a lower level. The trolley carrying the hindquarter then progresses along the lower level rail to a point where an operator entrusted with the duty of cutting up the hindquarter removes it from the trolley and places it on a cutting table. This operation, aside from the expenditure of time to permit the trolley carrying the hindquarter to travel through the track and switch before entering the declining rail, required the attention and efforts of an operator to remove the trolley carrying the hindquarter along the track and through the switch.

Accordingly, an object of the present invention is to provide a switch which will automatically transfer the trolley to a lower level track.

Another object of the present invention is to provide a switch which will automatically turn the trolley carrying a hindquarter through 180° while bringing it in line for transfer to a lower level track.

A further object of the present invention is to provide an automatic transfer switch which is simple and extremely expeditious in operation, and easy to install.

Other objects and advantages will be apparent as the invention is described in greater detail in connection with the accompanying drawings wherein.

Figure 2:
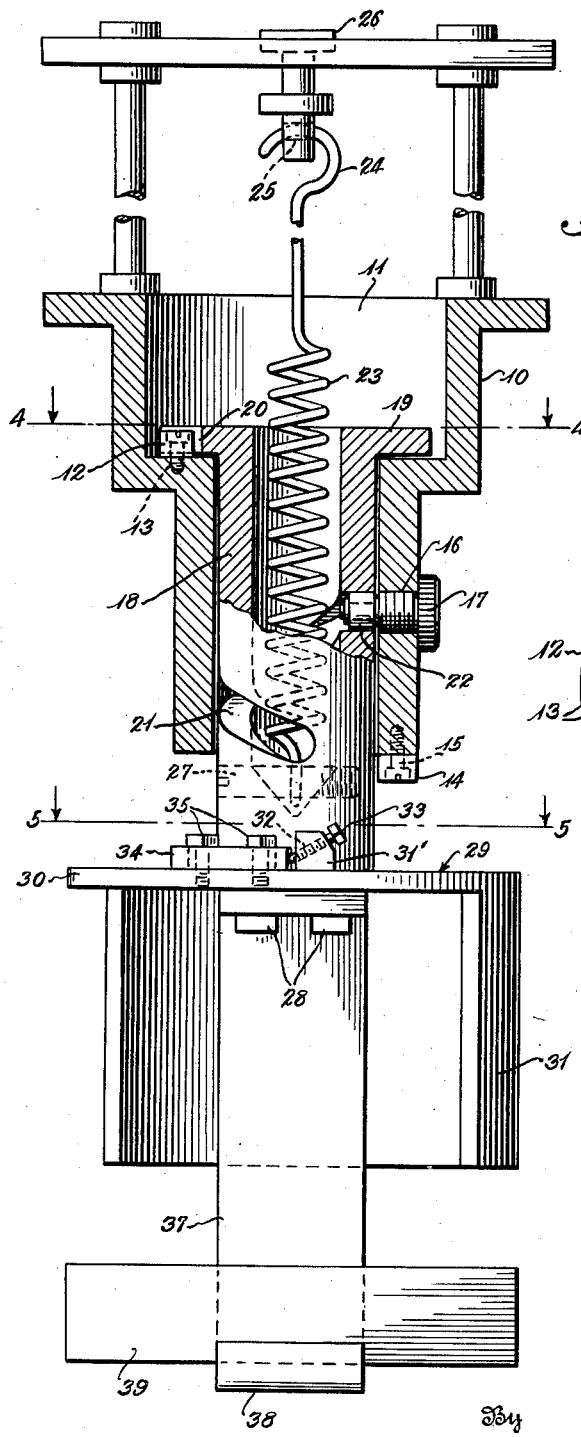
Figure 2 is an enlarged sectional view of the transfer switch according to the present invention.

Referring to the drawings, the automatic switch according to the present invention comprises a stationary member or outer shell 10, Figure 2, having a cup shaped portion 11 at its upper end. Mounted upon the base of the cup shaped portion adjacent the side wall thereof is a stop member 12, Figure 4, which is fixedly secured thereto by means of bolts 13. Depending from the bottom of the wall of the shell 10 at a point substantially diametrically opposite to that of the mounting of the stop member 12 is a stop 14, Figure 2, the stop 14 being fixedly secured thereto by means of a bolt 15. In the portion of the wall of the shell 10 from which the stop 14 depends there is provided a threaded opening 16 through which extends in threaded engagement a threaded bolt 17.

Figure 4:
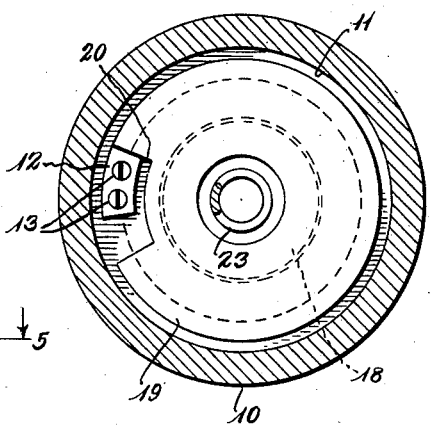
Figure 4 is a view taken on the line 4—4 of Figure 2.

Concentrically mounted within the shell 10 is a movable member or sleeve 18 having a flange 19 about its upper end, said flange in the portion adjacent the stop member 12 being provided with an arcuate slot 20, Figure 4, for the reception therein of the said stop member 12. As shown in this figure, the slot is of a size somewhat larger than the stop member 12, this being for the purpose to be subsequently described. Extending around the inner peripheral surface of the sleeve 18 is a spiral shaped slot 21, Figure 2, in which rides a roller 22 carried by the inner end of the threaded bolt 17. Disposed within the sleeve 18 is a spring 23, the upper end of which carries a hook 24 engaging an eye 25 projecting from a supporting plate 26 fixedly secured to the rafters or ceiling of a building. The lower end of the spring is secured to the sleeve 18 by means of the pin 27.

Figure 3:
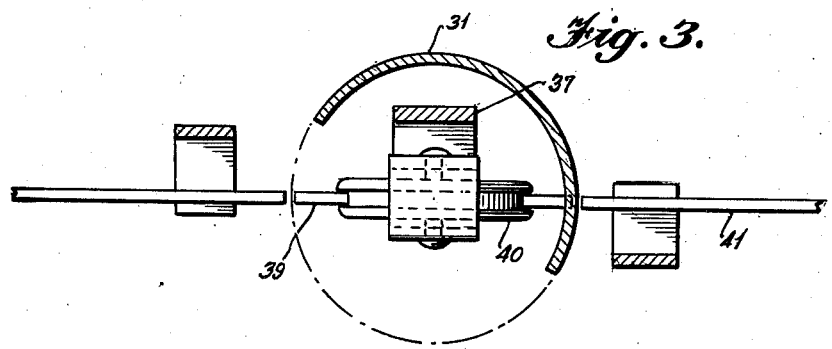
Figure 3 is a plan view showing the operation of the transfer switch according to the present invention.
Figure 5:
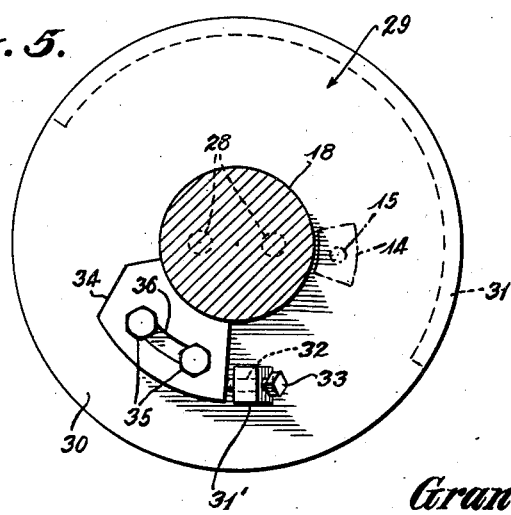
Figure 5 is a view taken on the line 5—5 of Figure 2.
Figure 6:
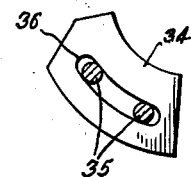
Figure 6 is a plan view of the adjustable stop member shown in Figure 5.

Attached to the solid bottom of the sleeve 18, Figure 2, by means of bolts 28 is a stop or guard 29. As shown in Figures 3 and 5, the guard 29 includes a cylindrical top wall 30 and a side wall or skirt 31 in the form of a semi-circle depending therefrom. Fixedly mounted upon and projecting upwardly from the top wall 30 is an abutment 31', Figures 2 and 5, which is provided with an inclined threaded opening 32. Extending through the opening 32 and in threaded engagement therewith is a threaded bolt 33. Disposed upon the wall 30 at a point adjacent the abutment 31' is a stop member 34, Figure 5, of arcuate shape, secured thereto by means of bolts 35. As shown in Figure 6, the stop member 34 is provided with an arcuate slot 36, of a size such as to permit it to be moved within restricted limits toward and from the abutment 31'. Preferably, the stop member 34 is so adjusted with respect to the abutment 31' as to enable the face of the stop member to contact with the end of the threaded bolt 33 passing through abutment 31'.

Figure 1:
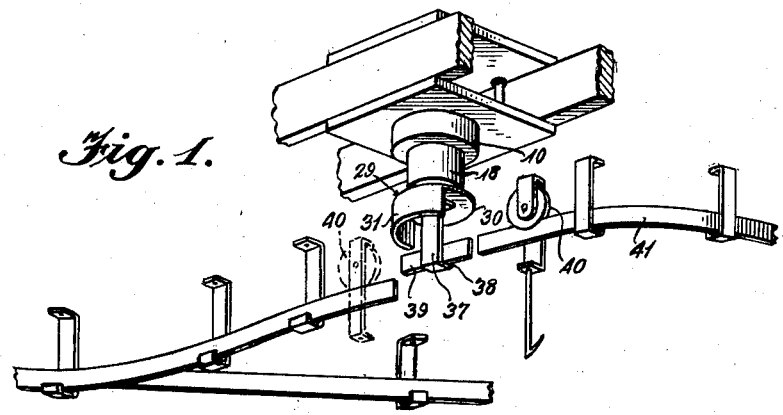
Figure 1 is a perspective view showing the operation of the transfer switch according to the present invention.

Attached to the lower end of the sleeve 18 is a hanger or strap 37, said hanger having an upturned end 38 in which is supported a trolley rail 39 for the reception of a trolley 40, Figure 1. The guard or stop 29 cooperates with the rail 39 to permit passage of a trolley onto or off of the rail from one end of the rail only. As will appear more fully below, the stop 29 and the rail 39 rotate together as a unit.

In operation of the switch above described, the trolley 40, Figure 1, carrying the hind of beef upon leaving the track rail 41 moves on to the trolley rail 39 carried by the hanger 37. As soon as the trolley 40 has moved on to the trolley rail of the hanger, the weight of the hind of beef carried by the trolley overcomes the tensional stress of the spring 23 and, causes the sleeve 18 to move rapidly downwardly in the shell 10. In its downward movement the sleeve 18 follows a spiral path by virtue of the slot 21 in the sleeve riding about the stationary roller 22 carried by the threaded bolt 17. This spiral movement of the sleeve 18 downwardly continues until an end wall of the arcuate slot 20 in the flange 19 of the sleeve engages the fixed stop member 12, whereupon such spiral movement is arrested or stopped. With the downward spiral movement of the sleeve 18, the guard 29, rail 39, and trolley 40 rotate therewith. The stop 12 is set to prevent further turning of sleeve 18 when rail 39 has dropped to the lower level of track 41 with said one end of rail 39 in alignment with the lower level of track 41 whereupon the trolley 40 may be moved on to the lower level of track rail 41.

With the release of the trolley 40 from the trolley rail 39 on to the lower level track rail 41, the spring 23 acts to cause the sleeve 18 to be moved rapidly upwardly in the shell 10. In its upward movement the sleeve follows a spiral path reverse to that in its downward movement by virtue of the slot 21 in the sleeve riding about the stationary roller 22. As the sleeve moves upwardly the arcuate slot 20 of the flange 19 of the sleeve moves out of cooperative relation with the stop member 12. This spiral movement upwardly of the sleeve continues until the free end of the adjustable stop member 34 contacts with the stop 14 carried by the end of the shell 10, whereupon such upward movement is arrested or stopped. Of course, with the movement of the sleeve upwardly the stop or guard 29 and rail 39 likewise rotate. After the tensional stress of the spring has caused the sleeve to move upwardly into contact with the stop 14, the sleeve will have rotated sufficiently to bring the guard or stop 29 to return to its uppermost position shown in Figure 1, where it is open to the higher level of track 41 so that an incoming trolley can roll onto rail 39 to be lowered as explained above.

It is to be noted that the sleeve in its downward course of travel is limited by the stop member 12 to a rotative movement of 180° while its upward course of travel is likewise restricted by the stop 14 to a rotative movement of 180°, although the spiral shaped slot 21 extends all around the sleeve.

Having fully described the invention, what I claim as new and desire to secure by Letters Patent is:

An automatic carcass turning device for an overhead trolley system for use in a slaughtering house comprising; a movable track segment adapted to communicate in an upper position with a track section leading into the segment and in a lower position with a track section leading away from the segment; a rotatable and substantially vertically movable mounting for supporting said segment; means to normally urge said segment toward its uppermost position; said urging and mounting means normally holding said segment in communication with said inleading track but being movable to said lower position to place said segment in communication with said outleading track when the lifting action of said urging means has been overcome as when a trolley loaded with a meat cut is run onto the segment; and means to effect a predetermined degree of rotation of said mounting means as the segment moves between its upper and lower positions so that said trolleys carrying the meat cuts which trolleys are in turn carried on said segment, are turned through said degree of rotation while simultaneously being lowered on said segment from the inleading rail to the outleading rail.

GRANVILLE FRANKLIN VINSANT.